(12) United States Patent
Flammer, III et al.

(10) Patent No.: US 10,313,447 B2
(45) Date of Patent: Jun. 4, 2019

(54) COLLABORATIVE SENSOR NETWORK

(71) Applicant: Shoof Technologies, Inc., Sunnyvale, CA (US)

(72) Inventors: George H. Flammer, III, Cupertino, CA (US); Elad Gottlib, Burlingame, CA (US)

(73) Assignee: Shoof Technologies, Inc., Cupertino, CA (US)

( * ) Notice: Subject to any disclaimer, the term of this patent is extended or adjusted under 35 U.S.C. 154(b) by 0 days.

(21) Appl. No.: 16/114,147

(22) Filed: Aug. 27, 2018

(65) Prior Publication Data

US 2019/0068714 A1 Feb. 28, 2019

Related U.S. Application Data

(60) Provisional application No. 62/551,132, filed on Aug. 28, 2017, provisional application No. 62/633,521, (Continued)

(51) Int. Cl.
*H04L 29/08* (2006.01)

(52) U.S. Cl.
CPC .................. *H04L 67/12* (2013.01)

(58) Field of Classification Search
CPC . H04L 67/12; H04L 67/1065; H04L 67/1061; H04L 67/127; H04L 67/16
(Continued)

(56) References Cited

U.S. PATENT DOCUMENTS 6,172,596 B1  1/2001 Cesar

2006/0066444 A1* 3/2006 Steeves .............. G06K 7/10108
340/10.5
(Continued)

OTHER PUBLICATIONS

International Application No. PCT/US2018/048400, International Search Report and Written Opinion dated Nov. 1, 2018.

*Primary Examiner* — Nay A Maung
*Assistant Examiner* — Angelica M Perez
(74) *Attorney, Agent, or Firm* — James E. Eakin

(57) ABSTRACT

A system comprises a first peer sensor tag configured to sense first sensor data using a first local sensor of the first peer sensor tag and a second peer sensor tag configured to sense second sensor data using a second local sensor of the second peer sensor tag while the second peer sensor tag is not within a communication range of the first peer sensor tag. The second peer sensor tag is configured to detect a first beacon signal of the first peer sensor tag, the first beacon signal including at least a portion of the first sensor data, the first beacon signal being transmitted according to a first network communication protocol. The second peer sensor tag is configured to obtain the at least a portion of the first sensor data from the first beacon signal. A base station is configured to detect a second beacon signal of the second peer sensor tag, the first beacon signal including the at least a portion of the first sensor data and at least a portion of the second sensor data. The base station is configured to obtain the at least a portion of the first sensor data and the at least a portion of the second sensor data from the second beacon signal, and to provide the at least a portion of the first sensor data and the at least a portion of the second sensor data to a server system using a second network communication protocol different from the first network communication protocol.

18 Claims, 11 Drawing Sheets

Related U.S. Application Data filed on Feb. 21, 2018, provisional application No. 62/672,546, filed on May 16, 2018.

(58) Field of Classification Search
USPC ........................................ 455/500, 41.1–41.3
See application file for complete search history.

(56) References Cited

U.S. PATENT DOCUMENTS

| | | | |
|---|---|---|---|
| 2009/0201152 A1* | 8/2009 | Karr | G01S 5/14 340/545.6 |
| 2012/0126949 A1* | 5/2012 | Downie | G02B 6/3895 340/10.1 |
| 2013/0098989 A1 | 4/2013 | Salzman | |

* cited by examiner

COLLABORATIVE SENSOR NETWORK

CROSS-REFERENCE TO RELATED APPLICATIONS

The present application claims the benefit of U.S. Provisional Patent Application Ser. No. 62/551,132, filed Aug. 28, 2017 and entitled "Collaborative Sensor Network," U.S. Provisional Patent Application Ser. No. 62/633,521, filed Feb. 21, 2018 and entitled "Collaborative Sensor Network," and U.S. Provisional Patent Application Ser. No. 62/672,546, filed May 16, 2018 and entitled "Tag Initiated Positioning," which are hereby incorporated by reference herein.

TECHNICAL FIELD

This disclosure pertains to sensor networks. More particularly, this disclosure pertains to collaborative sensor networks.

BACKGROUND

Under conventional approaches, assets (e.g., shipping containers) may need to be identified, located, and/or monitored. Typically, barcodes, radio-frequency identification (RFID) tags, Global Positioning System (GPS) tags, and a variety of sensors are often emplaced on assets to identify, locate, and/or monitor assets. Traditionally, small computing devices are used to manage and record data from emplaced sensors in order to provide monitoring (e.g., "full time, real time" monitoring). Various wireless communication technologies have been used to deliver autonomous operation for assets, such as Wi-Fi, Bluetooth, and various cellular standards. However, these wireless technologies suffer from several technological problems which make them unsuitable for most asset monitoring applications. For example, cellular and Wi-Fi require infrastructure to enable communication, and the communicating assets cannot communicate unless they are within range of base stations. Others technologies (e.g., Bluetooth) do not have sufficient range for ubiquitous deployment. Furthermore, current technologies do not scale to handling tens of thousands of assets that may be in a single locale, and also suffer from excessive energy consumption, which may render them unusable for most battery powered applications.

SUMMARY

Various embodiments of the present disclosure include a system comprising a first peer sensor tag configured to sense first sensor data using a first local sensor of the first peer sensor tag. A second peer sensor tag is configured to sense second sensor data using a second local sensor of the second peer sensor tag while the second peer sensor tag is not within a communication range of the first peer sensor tag. The second peer sensor tag is configured to detect a first beacon signal of the first peer sensor tag, the first beacon signal including at least a portion of the first sensor data, the first beacon signal being transmitted according to a first network communication protocol. The second peer sensor tag is configured to obtain the at least a portion of the first sensor data from the first beacon signal. A base station configured to detect a second beacon signal of the second peer sensor tag, the first beacon signal including at least a portion of the first and second sensor data. The base station is configured to obtain the at least a portion of the first sensor data and the at least a portion of the second sensor data from the second beacon signal. The base station is configured to provide the at least a portion of the first sensor data and the at least a portion of the second sensor data to a server system, the at least a portion of the first sensor data and the at least a portion of the second sensor data being provided using a second network communication protocol different from the first network communication protocol.

In some embodiments, the first sensor data comprises temperature data, and the first local sensor of the first peer sensor tag comprises a temperature sensor.

In some embodiments, the second sensor data comprises humidity data, and the second local sensor of the second peer sensor tag comprises a humidity sensor.

In some embodiments, the first network communication protocol comprises a low-power network communication protocol.

In some embodiments, the second network communication protocol comprises an Internet-based network communication protocol.

In some embodiments, the second peer sensor tag is further configured to validate a source of the first beacon signal prior to obtaining the at least a portion of the first sensor data from the first beacon signal.

In some embodiments, the second peer sensor tag is further configured to generate additional sensor data based on the at least a portion of the first sensor data, the at least a portion of the second sensor data, and one or more tag rules executing on the second peer sensor tag.

In some embodiments, the additional sensor data is generated in response to a trigger condition of the one or more tag rules, and the additional sensor data is capable of facilitating a generation of a corresponding alert or notification.

In some embodiments, at least one of the one or more tag rules are at least partially user-defined by a user associated with an entity operating the second peer sensor tag.

Various embodiments of the present disclosure include systems, methods, and non-transitory computer readable media configured to sense, by a first peer sensor tag, first sensor data, the first sensor data being sensed by a first local sensor of the first peer sensor tag. Second sensor data is sensed, the second sensor data being sensed by a second local sensor of the second peer sensor tag while the second peer sensor tag is not within a communication range of the first peer sensor tag. A first beacon signal of the first peer sensor tag is detected by the second peer sensor tag, the first beacon signal including at least a portion of the first sensor data, the first beacon signal being transmitted according to a first network communication protocol. the at least a portion of the first sensor data is obtained from the first beacon signal by the second peer sensor tag. A second beacon signal of the second peer sensor tag is detected by a base station, the second beacon signal including the at least a portion of the first sensor data and at least a portion of the second sensor data, the second beacon signal being transmitted according to the first network communication protocol. The at least a portion of the first sensor data and the at least a portion of the second sensor data from the second beacon signal is obtained by the base station. The at least a portion of the first sensor data and the at least a portion of the second sensor data are provided to a server system by the base station, the at least a portion of the first sensor data and the at least a portion of the second sensor data being provided using a second network communication protocol different from the first network communication protocol.

In some embodiments, the first sensor data comprises temperature data, and the first local sensor of the first peer sensor tag comprises a temperature sensor.

In some embodiments, the second sensor data comprises humidity data, and the second local sensor of the second peer sensor tag comprises a humidity sensor.

In some embodiments, the first network communication protocol comprises a low-power network communication protocol.

In some embodiments, the second network communication protocol comprises an Internet-based network communication protocol.

In some embodiments, the second peer sensor tag is further configured to validate a source of the first beacon signal prior to obtaining the at least a portion of the first sensor data from the first beacon signal.

In some embodiments, the second peer sensor tag is further configured to generate additional sensor data based on the at least a portion of the first sensor data, the at least a portion of the second sensor data, and one or more tag rules executing on the second peer sensor tag.

In some embodiments, the additional sensor data is generated in response to a trigger condition of the one or more tag rules, and the additional sensor data is capable of facilitating a generation of a corresponding alert or notification.

In some embodiments, at least one of the one or more tag rules are at least partially user-defined by a user associated with an entity operating the second peer sensor tag.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
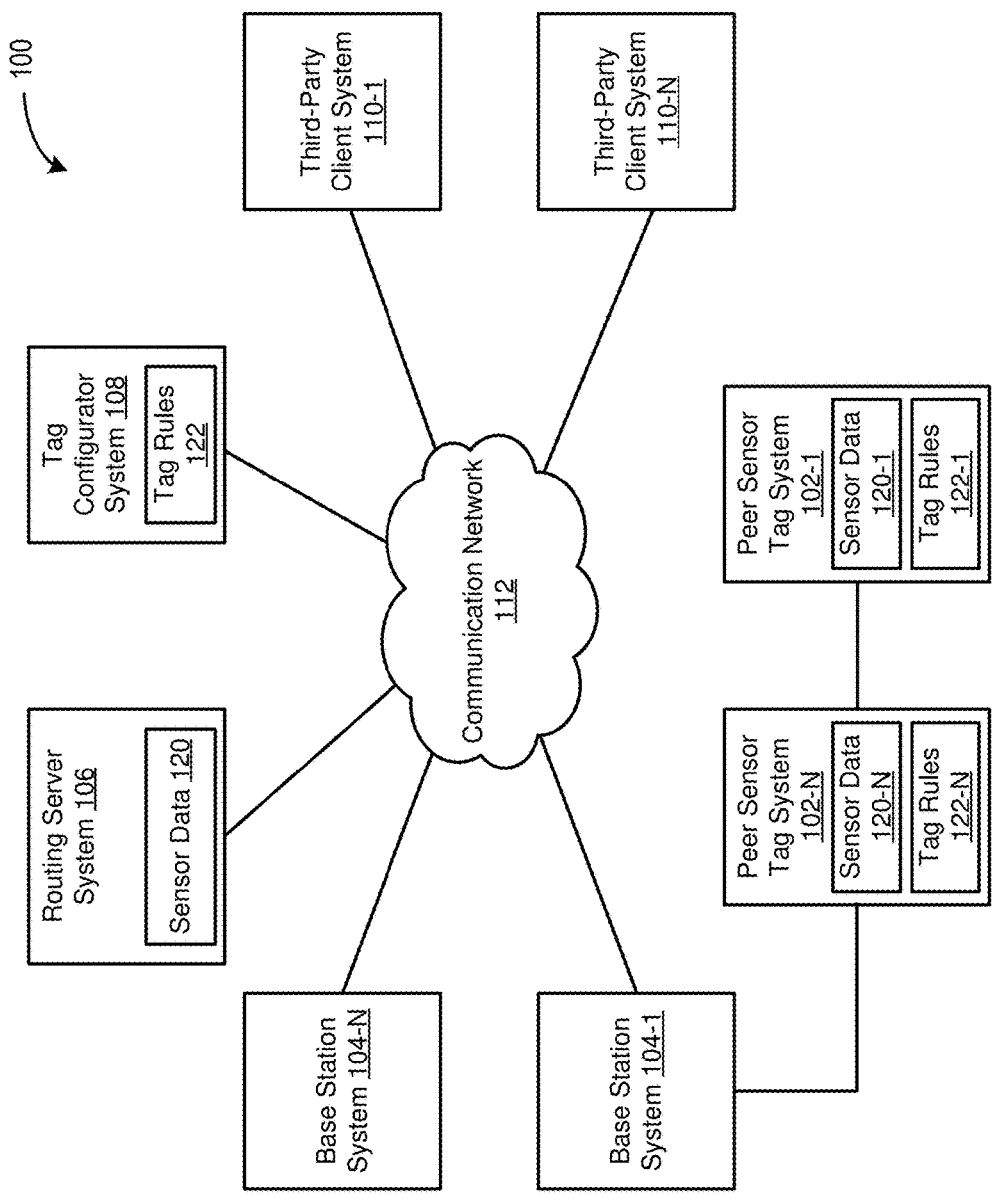
FIG. 1 depicts a diagram of an example collaborative network system according to some embodiments.

Sensors may be used to detect sensor data. For example, sensors may be mounted within an asset (e.g., shipping container) to detect temperature. While sensors have increasingly become smaller in size, they typically have limited functionality, and have power requirements that inhibit and/or prevent continuous real-time operation. For example, a traditional sensor may only be able to use sensor data from its local sensor (e.g., a temperature sensor), and may be required to transmit data over a Wi-Fi or cellular connection, which may require significant battery power.

A claimed solution rooted in computer technology overcomes problems specifically arising in the realm of computer technology. In various embodiments, a system is configured to create and/or manage autonomous ad-hoc networks (e.g., ad-hoc wireless low-power wide-area networks) to provide improved sensor functionality, and also reduce computing resource requirements (e.g., battery power requirements) of sensors and/or other associated devices (e.g., thereby allowing continuous real-time operation of sensors). In some embodiments, the system includes peer sensor tags that are configured to communicate with each other over an ad-hoc wireless network. For example, a first peer sensor tag with a temperature sensor may be deployed to monitor temperature within an asset, and a second peer sensor tag with a humidity sensor may be deployed to monitor humidity of the same or different asset. One or both of the peer sensor tags may not only use the sensor data of their own local sensors, but the sensor data of the other peer sensor tag, as well. For example, either peer sensor tag may be able to calculate a dew point based on the temperature data and the humidity data. The dew point data, and/or other sensor data, may be propagated (or, relayed) to a base station (e.g., via one or more other peer sensor tags), and then provided to a server (e.g., over the Internet). Accordingly, the system may achieve improved sensor functionality, while also maintaining relatively lower power requirements for the peer sensor tags since the peer sensor tags do not include functionality for communicating with the server, and instead utilize base stations for such functionality.

In various embodiments, assets may be moved, loaded and unloaded many different times, and it is not uncommon for an asset to be misplaced. The systems described herein may autonomously detect misplaced assets by monitoring motion (or lack thereof) detected by peer sensor tags, and time duration between peer sensor tags and base station communications. For example, a peer sensor tag disposed on a misplaced asset may indicate a status as an "orphan" to another peer sensor tag that comes in proximity to that peer sensor tag. When the other peer sensor tags get within range of a base station, they in turn may report the identity and status of the orphan and the time it was in contact. This alone may provide sufficient forensic information to generate an orphan report with likely location and the status of the orphaned asset. Accordingly, human intervention may not be required to identify orphaned assets according to the systems described herein.

FIG. 1 depicts a diagram 100 of an example collaborative network system according to some embodiments. In the example of FIG. 1, the system includes peer sensor tag systems 102-1 to 102-N (individually, the peer sensor tag system 102, collectively, the peer sensor tag systems 102), base station systems 104-1 to 104-N (individually, the base station system 104, collectively, the base station systems 104), a routing server system 106, a tag configurator system 108, third-party client systems 110-1 to 110-N (individually, the third-party client system 110, collectively, the third-party client system 110), and a communication network 112.

The peer sensor tag systems 102 (or, simply, peer sensor tags 102) may each function to detect, store, and/or wirelessly communicate sensor data 120. Sensor data 120 may include sensor data detected by one or more sensors (e.g., temperature sensors, humidity sensors, clocks, accelerometers, and/or the like), derived data (e.g., dewpoint data), and/or other data or information that may be communicated between peer sensor tags 102. For example, other information may include capabilities of a peer sensor tag 102 (e.g. sensor complement, memory or energy available, code version, relay capacity), network status of that peer sensor tag 102 (e.g., infrastructure-connection status, local operating parameters such as duty cycle, time and frequency synchronization, and routing protocol employed, etc.), and willingness to share storage, transmission bandwidth, sensor data, or processing. In various embodiments, functionality of the peer sensor tags 102 may be performed by one or more electronic sensors and other computing device components. For example, each of the peer sensor tags 102 may comprise a self-contained unit capable of detecting sensor data 120 and sharing sensor data 120 with one or more other peers and/or base stations over a wireless ad-hoc low-power network.

In some embodiments, the peer sensor tags 102 may each function to measure environmental or other conditions within the peer sensor tags 102 and/or outside the peer sensor tags 102 (e.g., if the peer sensor tag 102 is an "open-air" tag) using one or more local sensors of the peer sensor tags 102. Example local sensors include accelerometers (e.g., for identifying tilt conditions and/or and shock conditions), temperature, humidity, and molecular detectors (e.g., methane, etc.). Shock may be a condition indicated when acceleration in one or more axes is greater than tolerance. Tilt may be a condition when an asset changes orientation. This may cause goods within the asset to shift position and possibly become damaged.

In some embodiments, peer sensors tags 102 may include multiple sensors. For example, a single peer sensor tag 102 may have a temperature sensor, a humidity sensor, and/or the like. Some or all sensors may be active (e.g., functionality of sensor is enabled, and the sensor is actively detecting sensor data), sleeping (e.g., functionality of sensor is enabled, but the sensor is not currently detecting sensor data), inactive (e.g., functionality of sensor is disabled), at a given time. For example, tag rules 122 may define various functionalities of a peer sensor tag 102, and the tag rules 122 may define the humidity sensor is inactive, and the temperature sensor is inactive.

In some embodiments, peer sensor tags 102 may communicate intermittently synchronously, and/or asynchronously with one or more other peer sensor tags 102. For example, a group of peer sensor tag 122 may be configured (e.g., based on tag rules 122) to communicate (e.g., transmit a beacon signal), at the same time (e.g., each of the peer sensor tags 102 in the group "wake-up" and transmit and/or receive communications at the same 15 minute interval), and/or at different times (e.g., some or all of the peer sensor tags 102 in the group may "wake-up" and transmit and/or receive communications at different times within a 15 minute interval).

In some embodiments, peer sensor tags 102 may be mobile and may relay information from a peer sensor tag 102 that needs to convey information but is unable to communicate the information itself. In one example, an "orphaned asset" is an asset paired with a peer sensor tag 102 that has been out of communication for an excessive amount of time (e.g., more than threshold amount of time). A peer sensor tag 102 associated with the orphan may communicate its status (and/or other information) to another peer sensor tag 102 when the other peer sensor tag 102 comes within communication range. This status is then relayed by the other peer sensor tags 102 when it communicates with a base station 104 or another peer sensor tag 102 that may communicate with another peer sensor tag 102 or base station 104.

In one example, an asset may be misplaced, stolen, abandoned, and/or otherwise orphaned, in an area outside of base station coverage (e.g., a storage area of a distribution center). The peer sensor tag 102 of that asset, after being immobile and out of communication for a predetermined period of time, may set the asset status as being orphaned and will actively seek out other peer sensor tags 102. When another asset with a peer sensor tag 102 passes through the distribution center, the other peer sensor tag 102 may receive the information from the orphaned peer sensor tag 102 (e.g., the peer sensor tag 102 associated with the orphaned asset) and subsequently relay this information along with time and/or location information so the orphaned asset's location can be determined.

In some embodiments, peer sensor tags 102 provide localized redundancy when a peer sensor tag 102 communicates (e.g., when a peer sensor tag 102 communicates a possible anomalous condition). Peer sensor tags 102 may store information providing redundant storage and reportage of an anomalous event. For example, in a situation where a peer sensor tag 102 associated with an asset detects tampering or being moved when not authorized (e.g., stolen), the peer sensor tag 102 may provide the information to other peer sensor tags 102 to store and send to a server (e.g., routing server system 104) through a base station 104. This way, as the data propagates from peer sensor tags 102 to peer sensor tag 102, it will be increasingly difficult to destroy the record of the theft event (e.g., even when cloud connectivity is not available).

The base station systems 104 (or, simply, base stations 104) may function to receive, store, and/or provide data. For example, base stations 104 may receive sensor data from peer sensor tags 102 (e.g., via beacons and/or other signals transmitted by the peer sensor tags 102) using a first communication protocol that is compatible with the peer sensor tags 102 (e.g., a low-power wide-area network protocol), and provide the data to a server using a second network communication protocol (e.g., a network communication protocol of the communications network 112). While the peer sensor tags 102 are generally mobile and lack a cloud-connection (e.g., Internet connection), the base stations 104 may be in fixed locations. In some embodiments, functionality of the base station systems 104 may be performed by one or more network computing devices, such as a Wi-Fi router or base station, and/or other computing devices configured as described herein.

The routing server system 106 may function to store, manage, secure, analyze, present, and/or distribute sensor data 120. In various embodiments, functionality of the routing server system 102 may be performed by one or more servers (e.g., a cloud-based server) and/or other computing devices. The routing server system 102 may be implemented by a cloud-computing platform.

The tag configurator system 108 may function to create, read, update, and/or delete tag rules 122. Tag rules 112 may define some or all of the features of functionality of a peer sensor tag 102. For example, the tag configurator system 108 may create tag rules 122 controlling sensor functionality of a peer sensor tag 102, setting attributes (e.g., tag identifiers), setting communication protocols, and/or the like. In some embodiments, the tag configurator system 108 creates tag rules 122 in response to user input. For example, an operator of a peer sensor tag may define and load one or more predefined and/or custom tag rules 122 on to a peer sensor tag 102

The third-party client system 110 may each function to receive data, present data, and/or generate requests for data. For example, a third-party client system 110 may be associated with an entity (e.g., Walmart), and the entity may operate and/or otherwise be associated with one or more peer sensor tags 102. The third-party client system may request data (e.g., sensor data 120) associated with those peer sensor tags 102 from a remote system (e.g., routing server system 106) over a communications network (e.g., communications network 112). In various embodiments, functionality of the third-party client system 110 may be performed by one or more servers and/or other computing devices.

In some embodiments, the third-party client system 110 may estimate locations of peer sensor tags 102 without using actual location information (e.g., GPS information). For example, a first peer sensor tag (e.g., peer sensor tag 102-1) may communicate with a second peer sensor tag (e.g., peer sensor tag 102-N) at a particular time (e.g., 11:15 PM on Jan. 1, 2011). Each of the peer sensor tags 102 may store that information. Prior to communicating with each other, each of the peer sensor tags 102 may have originated from a known location. For example, the last known location for the first peer sensor tag 102 may be base station 104-1, and the last known location of the second peer sensor tags 102 may be base station 104-N. The particular time of the communication may be propagated to one or more peer sensor tags 102, a base station 104, remote server, and then to the third-party client system 110. The third-party client system 110 may use this information to estimate a location of one or both of the peer sensor tags 102. For example, the third-party client system 110 may estimate that the location is between the known location of base station 104-1 and the known location of the base station 104-N. This location estimate may be further refined based on other sensor information that may have been communicated between the first and second peer sensor tags 102 at the particular time (e.g., clock time, speed and/or acceleration information).

The communications network 112 may represent one or more computer networks (e.g., LAN, WAN, or the like) or other transmission mediums. The communication network 112 may provide communication between systems 102, 104, and/or 108-110. In some embodiments, the communication network 112 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth. The communications network 112 may include cellular networks.

Figure 2:
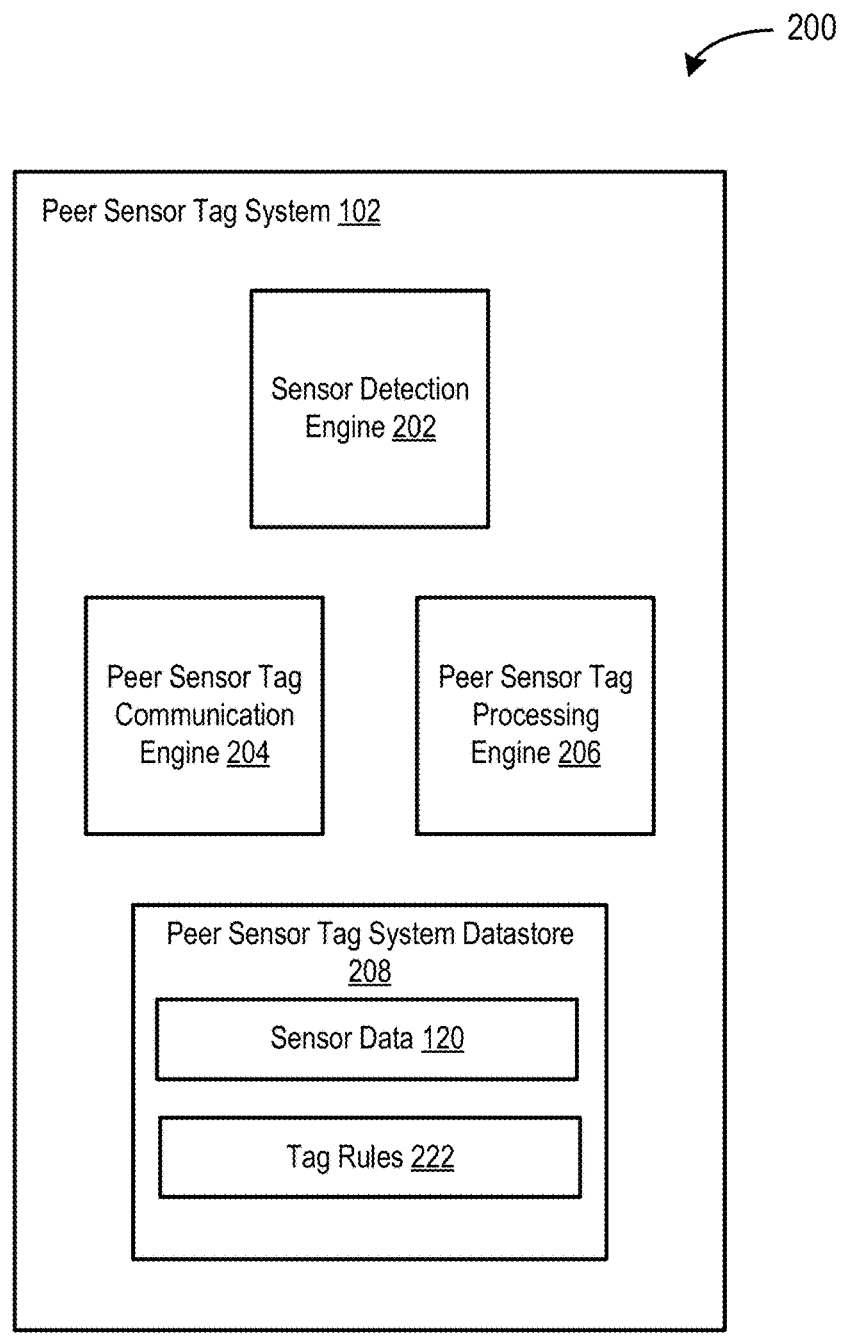
FIG. 2 depicts a diagram of an example of a peer sensor tag according to some embodiments.

FIG. 2 depicts a diagram 200 of an example of a peer sensor tag 102 according to some embodiments. In the example of FIG. 2, the peer sensor tag 102 includes a sensor detection engine 202, a peer sensor tag communication engine 204, a peer sensor tag processing engine 206, and a peer sensor tag datastore 208.

The sensor detection engine 202 may function to detect (or, "sense") sensor data 120. The sensor detection engine 202 may include one or more sensor devices. The sensor devices may be positioned within a closed housing of the peer sensor tag 102, or the sensor device may be exposed (e.g., an open-air sensor without a closed housing).

The peer sensor tag communication engine 204 may function to create and/or communicate over one or more wireless networks (e.g., a low-power wide-area network, an ad-hoc network). In some embodiments, incoming wireless signals arrive at an antenna and are routed via a switch to a receiver which converts the incoming signal into a form suitable for demodulation (i.e., turning signals into data) by a demodulator. The incoming data may be stored at least temporarily (e.g., cached, buffered), and/or prepared for transmissions to a remote system (e.g., a base station 104).

In some embodiments, the peer sensor tag communication engine 204 may function to generate and/or receive signals. The signals may include beacon signals and/or other types of signals. For example, the peer sensor tag communication engine 204 may transmit a beacon signal periodically (e.g., every 15 minutes) and/or based on other conditions (e.g., whether the peer sensor tag 102 has detected the presence of one or more base stations 104 and/or peer sensor tags 102 authorized to receive their communications). In some embodiments, the peer sensor tag communication engine 204 provides communications in response to one or more rules (e.g., tag rules 122) and/or in response to interrupt signals generated by a local sensor.

In some embodiments, the peer sensor tag communication engine 204 may push and/or pull information. For example, the peer sensor tag communication engine 204 may push (e.g., beacon) data at predetermined intervals and/or when a particular peer sensor tags 102 or base station 104 is within communication range. In another example, the peer sensor tags communication engine 204 may pull information from particular peer sensor tags 102 and/or base stations 104. In some embodiments, the peer sensor tag communication engine 204 may identify peer sensor tags 102 within communication range, request their attributes (e.g., sensor type), and generate a pull request any peer sensor tags that have relevant information. For example, a particular peer sensor tag 102 may want determine a dew point but only have a temperature sensor. The peer sensor tags 102 may search other peer sensor tags 102 within a particular vicinity for humidity data, and pull the humidity from the relevant peer sensor tags 102.

The peer sensor tag processing engine 206 may function to generate and/or analyze data, and/or trigger communication of information. In some embodiments, the peer sensor tag processing engine 208 may execute tag rules 122 to trigger generation and communication of information indicating an alert or other warning condition. For example, if a detected temperature rises above a threshold hold level, an orphan status is determined, and/or the like, the peer sensor tag processing engine 208 may trigger generation of information indicating the warning, orphan status, and/or the like, and that information may be propagated to other peer sensor tags 102 and/or base stations 104.

In some embodiments, the peer sensor tag processing engine 206 may identify characteristics of one or more other peer sensor tags 102. This may permit immediate detection, recording, and reportage of a wide variety of group characteristics. These may include but are not limited to: (a) proximity between food and hazardous materials/dangerous goods; goods that should be separated, (b) multiple containers in a single shipment which are intended to stay together; goods that should stay together, (c) environmental conditions (e.g. temperature) of peers that could give 'early warning' to potential pending anomalous conditions, etc. In this case, a peer sensor tag 102 can be provided with the information regarding the type of asset it is mounted on and thus determine its category (e.g., hazardous materials, food, liquids, military ordinance, or the like). Alternatively, a peer sensor tag 102 may be loaded with information when the goods to be carried are loaded on the asset since the information might only then be available from the cloud. In examples where the category of the content or goods in an asset is available on the peer sensor tag 102, the peer sensor tag communication engine 208 may autonomously report any violation of pre-determined rules or specifically loaded rules (e.g., such rules being stored in the peer sensor tag). Note that such rules may be loaded via the cloud from the base station, or even from another tag. In cases where the content is not known the determination of any rule violation can be done in the cloud through analysis of routing and location information.

In some embodiments, the peer sensor tag processing engine 206 may utilize information previously collected by peer sensor tags 102 to improve performance. For example, a peer may request or pass information regarding local wireless regulations. A peer sensor tag 102 may pass information regarding the existence or status of other peer sensor tags 102 including the information necessary to associate with said peer sensor tags 102. When a peer sensor tag 102 is outside of the range of a base station 104, the peer sensor tag 102 may communicate with other peer sensor tags 102 or use other peer sensor tags 102 to relay information to the base station 104. When a peer sensor tag 102 arrives in a new area (such as arriving in a port from another country), the newly arrived peer sensor tag 102 may seek other peer sensor tags 102 when out of coverage of a base station 104. Additionally, a peer sensor tag 102 can send performance related information such as known blocked or noisy channels, channel propagation information, and/or the like. This collective information, sent collaboratively, may be used to determine the frequency, data rates, and modulation of operation.

In some embodiments, the peer sensor tag processing engine 206 may differentially utilize other peer sensor tags 102 for specific purposes (e.g., through capability discovery). One example includes the peer sensor tag processing engine 206 triggering the peer sensor tag communication engine 206 to forward information to a peer sensor tag 102 that has connectivity to base station 104. In another example, a peer sensor tag processing engine 206 may cause the peer sensor tag communication engine 204 to query another peer sensor tag 102 with a sensor for methane to determine an existence of a potentially hazardous condition. In another example, the peer sensor tag processing engine 206 may cause the peer sensor tag communication engine 204 to query another peer sensor tag 102 for its software version and subsequently request a secure transfer of software (e.g., for performing a software update).

In some embodiments, the peer sensor tag processing engine 206 may determine a range between peer sensor tags 102. For example, the peer sensor tag processing engine 206 may determine its relative distance or location to one or more other peer sensor tags 102. In some embodiments, a base station 104 may determine a distance and bearing to a peer sensor tag 102 (and thus a relative location of a particular peer sensor tag 102) and a peer sensor tag 102 may determine distance and bearing (and thus location) to another base station 104 or a peer sensor tag 102.

In some embodiments, distances between peer sensor tags 102, and therefore the assets they are mounted on, may be important for a variety of reasons. Particular assets may not be allowed in proximity to other assets. For example, dangerous goods (e.g., industrial acids or fuels) may not be permitted by regulation to be shipped in proximity to food or other some organic materials. When a peer sensor tag 102 on a carrier of hazardous materials is moving (or stopped moving), the peer sensor tag 102 may communicate with the other peer sensor tags 102 around it and determine the types of assets (e.g., containers and/or type of cargo). By determining distances to those peer sensor tags 102, the peer sensor tag 102 may report if there is a policy violation. Alternately, this may be determined remotely (e.g., by routing server system 106 and/or third-party client system 110).

In some embodiments, distance determination may also facilitate grouping of peer sensor tags 102 and/or assets. With grouping, certain assets are required to stay together as a group. Since peer sensor tags 102 can measure distance to other tags in their group they can determine when one of the assets in the group gets separated and/or provide appropriate notifications.

In some embodiments, the peer sensor tag processing engine 206 may determine a distance based on an exchange of information in such a way that a time of flight (e.g., an exact or substantially accurate time of flight) may be determined between two peer sensor tags. In one example, time-of-flight may be done coarsely through using a hardware timer or more precisely by measuring phase of the signals from each peer sensor tag 102 and calculating the difference in phase resulting from the duration the signal traveled between the peer sensor tags. By calculating the phase difference, the carrier frequency may use and employ the constant speed of light to calculate the physical distance between the peer sensor tags can be determined.

Figure 3:
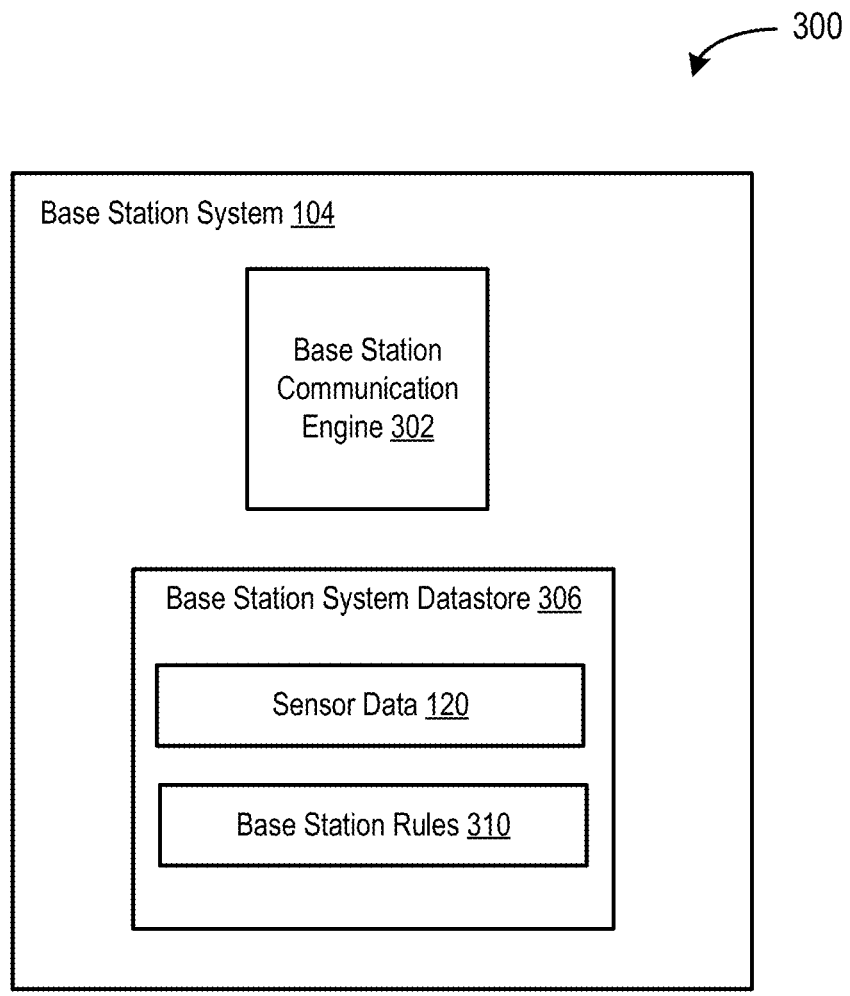
FIG. 3 depicts a diagram of an example of a base station according to some embodiments.

FIG. 3 depicts a diagram 300 of an example of a base station 104 according to some embodiments. In the example of FIG. 3, the base station 104 includes a base station communication engine 302 and a base station system datastore 304.

The base station communication engine 302 may function to receive data from peer sensor tags and/or other base stations 104. For example, the base station communication engine 302 may detect beacon signals and/or other signal from peer sensor tags, and obtain data from those signals. The base station communication engine 302 may provide data to one or more remote systems (e.g., routing server system 106) over a communications network (e.g., communications network 112).

The base station communication engine 302 may function to send requests, transmit and, receive communications, and/or otherwise provide communication with one or a plurality of systems. In some embodiments, the communication engine 302 functions to encrypt and decrypt communications. The communication 302 may function to send requests to and receive data from one or more systems through a network or a portion of a network. Depending upon implementation-specific considerations, the communication engine 302 may send requests and receive data through a connection, all or a portion of which may be a wireless connection. The communication engine 302 may request and receive messages, and/or other communications from associated systems. Communications may be stored in the system datastore 304.

Figure 4:
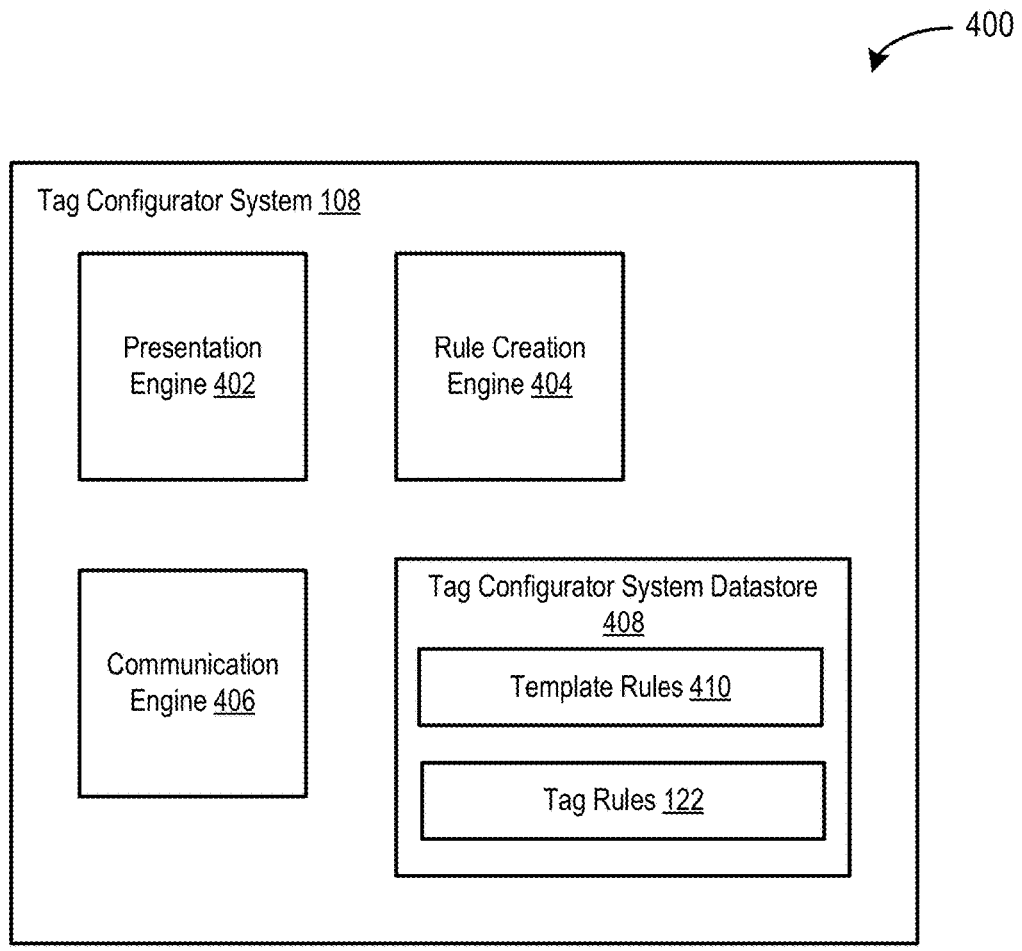
FIG. 4 depicts a diagram of an example of a tag configurator system according to some embodiments.

FIG. 4 depicts a diagram 400 of an example of a tag configurator system 108 according to some embodiments. In the example of FIG. 4, the tag configurator system 108 includes a presentation engine 402, a rules creation engine 404, a communication engine 406, and a tag configurator system datastore 408.

The presentation engine 402 may function to generate graphical user interfaces (GUIs) for displaying, and/or otherwise presenting, content. As used herein, content may include template rules 410, tag rules 122, sensor data 120, and/or other information described herein. In some embodiments, the presentation engine 402 may cooperate with a client system (e.g., third-party client system 110) to present content on a GUI.

The rules creation engine 404 may function to create template rules 410 and tag rules 122. The rules creation engine 404 may create tag rules 122 "from scratch" and/or from one or more template rules 410. For example, the template rules 410 may be predefined with particular attributes (e.g., tag identifier, tag description, entity or operator id, trigger conditions) and/or default attribute values. The rules creation engine 404 may create tag rules 122 based on user input. For example, a user may specify rules 122 for detecting mold growth, defining peer connection mechanisms, sensor functionality, and/or other attributes or features described herein.

In some embodiments, the rules creation engine 404 may define one or more asset categories of a tag rule 122. For example, the rules creation engine 404 may define that a particular peer sensor tag 102 has a hazardous materials category, food category, liquids category, military ordinance category, and/or the like. The rules creation engine 404 may deploy tag rules 122 to peer sensor tags 102 (e.g., by plugging the peer sensor tags 102 into a third-party client system executing the tag configurator system 110), thereby causing that peer sensor tag 102 to function according to those rules 122.

In some embodiments, the rules creation engine 404 defines operation of one or more manual inputs of a peer sensor tag 102 (e.g., a user pressing a button of a peer sensor tag 102). For example, the rules creation engine 404 may define a tag rule 122 that allows a user to switch between categories (e.g., between food and liquid) based on a manual input, and/or otherwise change some or all of the functionalities of a peer sensor tag 102 based on manual inputs.

The communication engine 406 may function to send requests, transmit and, receive communications, and/or otherwise provide communication with one or a plurality of systems. In some embodiments, the communication engine 406 functions to encrypt and decrypt communications. The communication 406 may function to send requests to and receive data from one or more systems through a network or a portion of a network. Depending upon implementation-specific considerations, the communication engine 406 may send requests and receive data through a connection, all or a portion of which may be a wireless connection. The communication engine 406 may request and receive messages, and/or other communications from associated systems. Communications may be stored in the system datastore 408.

Figure 5:
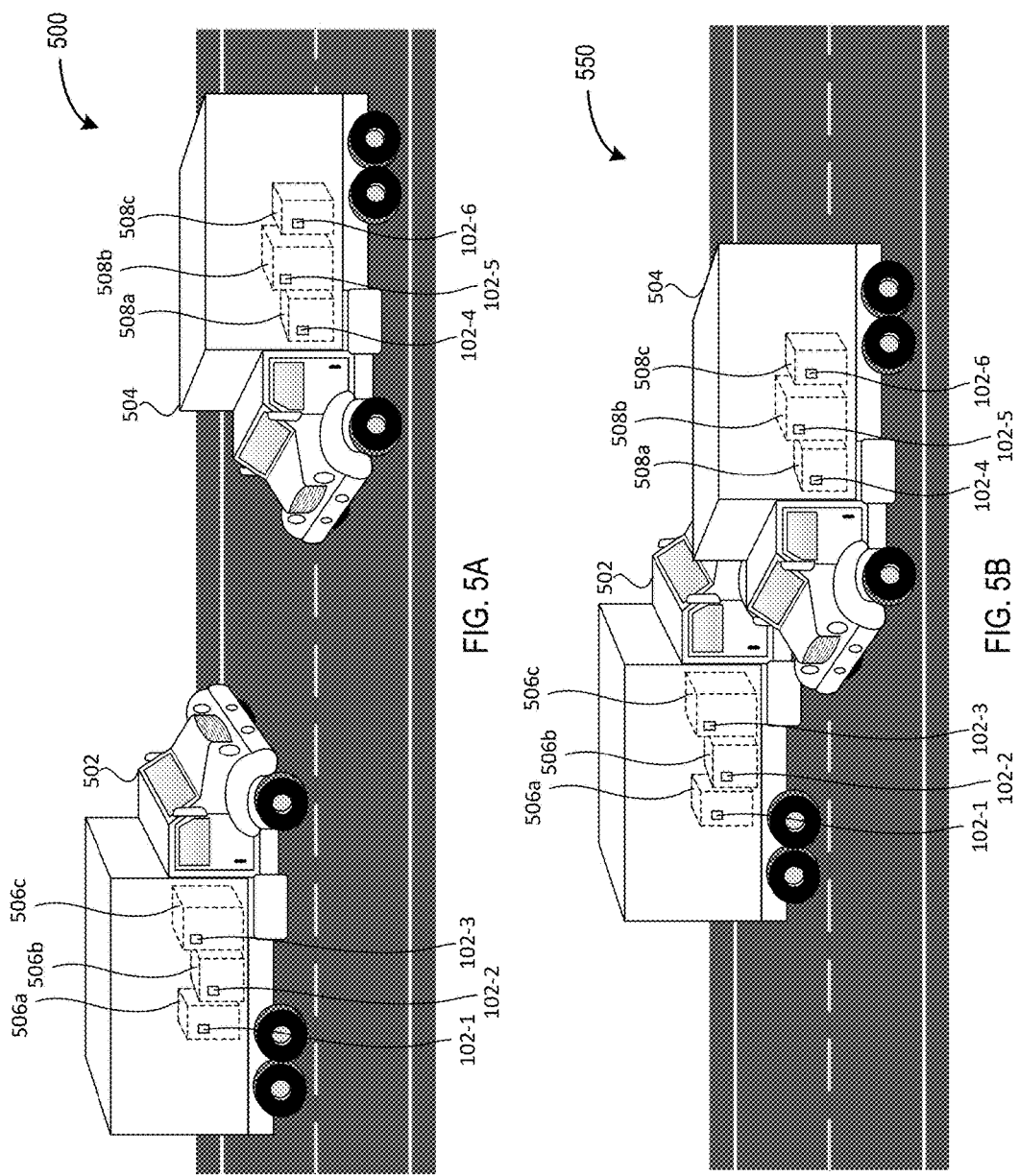
FIGS. 5A and 5B depict diagrams of an example communication between a first peer sensor tag and a second peer sensor tag according to some embodiments.

FIGS. 5A-B depict diagrams 500 and 550 of an example communication between a first peer sensor tag and a second peer sensor tag according to some embodiments. The diagrams 500 and 550 include a first transportation vehicle 502 and a second transportation vehicle 504. The first transportation vehicle 502 includes assets 506a-c, and the second transportation vehicle includes assets 508a-c. The assets 506 and 508 each include a respective peer sensor tag 102. As shown in FIG. 5A, the transportation vehicles 502 and 504 are heading in opposite directions, and the peer sensor tags 102 of the first transportation vehicle 502 are outside communication range of the peer sensor tags 102 of the second transportation vehicle 504, so the peer sensor tags 102-1 to 102-3 may not communicate with the peer sensor tags 102-4 to 102-6, although the peer sensor tags 102-1 to 102-3 may communicate with each other, and the peer sensor tags 102-4 to 102-6 may communicate with each other. As shown in FIG. 5B, the first and second transportation vehicles are within communication range, and the peer sensor tags 102-1 to 102-3 may communicate with the peer sensor tags 102-4 to 102-6. In some embodiments, when the peer sensor tags 102 are configured to wake up and share information with nearby tags, e.g., every 15 minutes, it is possible that the peer sensor tags 102-1 to 102-3 miss peer sensor tags 102-4 to 102-6, unless the transportation vehicles 502 and 504 park at a common rest stop. It will be appreciated that these are example communication ranges are shown for illustrative purposes, and may not reflect actual communication range distances.

Figure 6:
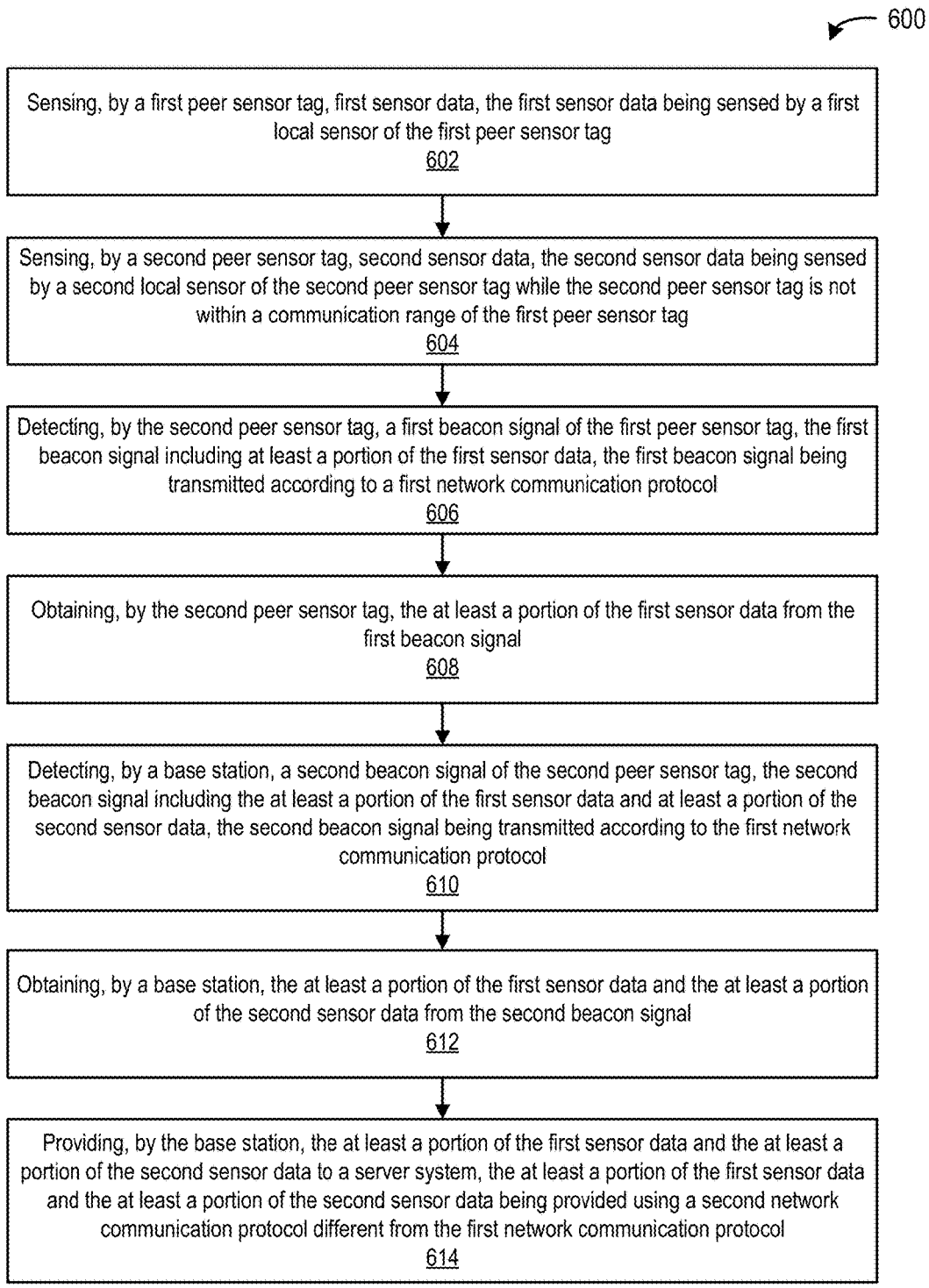
FIG. 6 depicts a flowchart of an example of a method of operation of a collaborative sensor network according to some embodiments.

FIG. 6 depicts a flowchart 600 of an example of a method of operation of a collaborative sensor network according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 602, a first peer sensor tag (e.g., peer sensor tag 102-1) senses first sensor data (e.g., sensor data 120-1). The first sensor data may be sensed by a first local sensor of the first peer sensor tag. In some embodiments, a sensor detection engine (e.g., sensor detection engine 202) of the first peer sensor tag senses the first sensor data.

In step 604, a second peer sensor tag (e.g., peer sensor tag 102-N) senses second sensor data (e.g., sensor data 120-N). The second sensor data may be sensed by a second local sensor of the second peer sensor tag while the second peer sensor tag is not within a communication range of the first peer sensor tag. In some embodiments, a sensor detection engine (e.g., sensor detection engine 202) of the second peer sensor tag senses the second sensor data.

In step 606, the second peer sensor tag detects a first beacon signal of the first peer sensor tag, the first beacon signal including at least a portion of the first sensor data, the first beacon signal being transmitted according to a first network communication protocol (e.g., low-power wide-area network, according to a predetermined schedule, e.g., periodically, at predetermined times, etc.). It will be appreciated that although beacon signals are used in this example, other types of signals and/or other types of transmission may be used in other examples. In some embodiments, a peer sensor tag communication engine (e.g., peer sensor tag communication engine 204) of the second peer sensor tag wakes to detect the first beacon signal at the appropriate time. In some embodiments, the first beacon signal may be generated by a peer sensor tag communication engine (e.g., peer sensor tag communication engine 204) of the first peer sensor tag.

In step 608, the second peer sensor tag obtains the at least a portion of the first sensor data from the first beacon signal. In some embodiments, the peer sensor tag communication engine of the second peer sensor tag obtains the at least a portion of the first sensor data from the first beacon signal.

In step 610, a base station (e.g., base station 104-1) detects a second beacon signal of the second peer sensor tag. The second beacon signal may include the at least a portion of the first sensor data and at least a portion of the second sensor data. The second beacon signal may be transmitted according to the first network communication protocol. In some embodiments, the second beacon signal of the second peer sensor tag may be generated by the peer sensor tag communication engine of the second peer sensor tag. In some embodiments, a base station communication engine (e.g., base station communication engine 302) detects the second beacon signal.

In step 612, the base station obtains the at least a portion of the first sensor data and the at least a portion of the second sensor data from the second beacon signal. In some embodiments, the base station communication engine obtain the data from the signal.

In step 614, the base station provides the at least a portion of the first sensor data and the at least a portion of the second sensor data to a server system (e.g., routing server system 102), the at least a portion of the first sensor data and the at least a portion of the second sensor data being provided using a second network communication protocol (e.g., a Wi-Fi and/or Internet-based protocol) different from the first network communication protocol. In some embodiments, the base station communication engine provides the data over a communication network (e.g., communication network 112).

Figure 7:
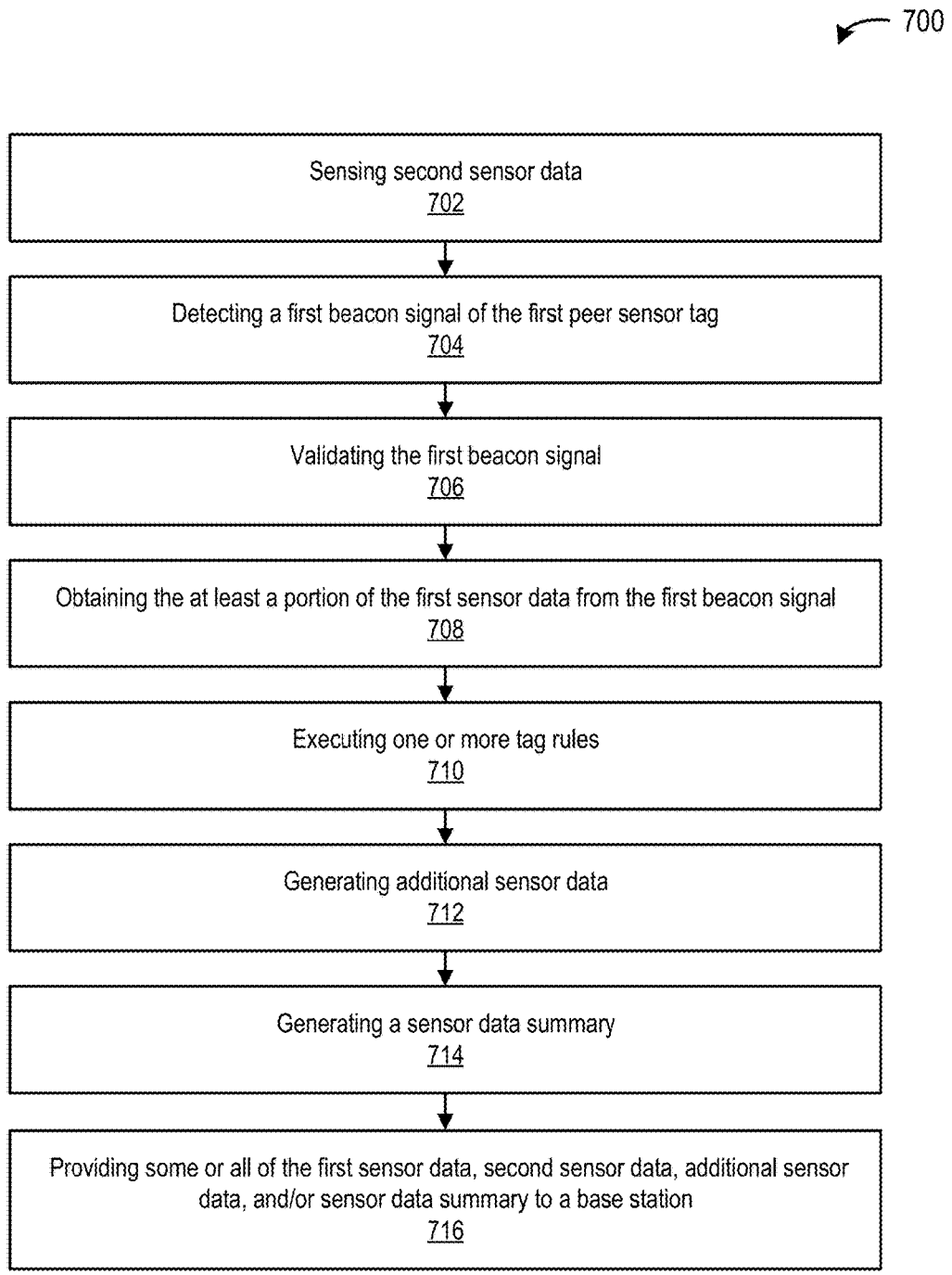
FIG. 7 depicts a flowchart of an example of a method of operation of a peer sensor tag according to some embodiments.

FIG. 7 depicts a flowchart 700 of an example of a method of operation of a peer sensor tag according to some embodiments.

In step 702, a second peer sensor tag (e.g., peer sensor tag 102-N) senses second sensor data (e.g., sensor data 120-N). The second sensor data may be sensed by a second local sensor of the second peer sensor tag while the second peer sensor tag is not within a communication range of a first peer sensor tag. The first peer sensor tag may detect first sensor data using a first local sensor of the first peer sensor tag. In some embodiments, a sensor detection engine (e.g., sensor detection engine 202) of the second peer sensor tag senses the second sensor data.

In step 704, the second peer sensor tag detects a first beacon signal of the first peer sensor tag, the first beacon signal including at least a portion of the first sensor data, the first beacon signal being transmitted according to a first network communication protocol (e.g., low-power wide-area network protocol). It will be appreciated that although beacon signals are used in this example, other types of signals and/or other types of transmission may be used in other examples. In some embodiments, a peer sensor tag communication engine (e.g., peer sensor tag communication engine 204) of the second peer sensor tag detects the first beacon signal. In some embodiments, the first beacon signal may be generated by a peer sensor tag communication engine (e.g., peer sensor tag communication engine 204) of the first peer sensor tag.

In step 706, the second peer sensor tag validates the first beacon signal, the data contained therein, and/or a source of the signal. For example, the peer sensor tag system may validate whether it is authorized to receive signals and/or information from the first peer sensor tag. The validation may be performed by a processing engine (e.g., peer sensor tag processing engine 208) based on one or more rules (e.g., tag rules 222). The rules may comprise one or more whitelists and/or blacklists including peer sensor tag identifiers. This may help ensure data privacy, for example, by allowing peer sensor tag system to only receive data from authorized peers. For example, a peer sensor tag operated by Walmart may be configured to only receive signals from other tags operated by Walmart (e.g., as indicated the associated tag rules 222). Accordingly, a Walmart tag may invalidate and/or ignore signals from peer sensor tag operated by other entities, and/or otherwise be prevented from obtaining data from peer sensor tag system operated by other entities.

In some embodiments, a peer sensor tag may be configured to receive certain types of information and/or signals from a particular entity, but ignore and/or invalidate other types of information and/or signals. For example, a peer sensor tag may associated with Walmart may receive communications from other peer sensor tags associated with Walmart, and may also receive some but not all communications from another entity's peer sensor tag (e.g., a FedEx peer sensor tag). In some embodiments, a peer sensor tag may be configured to receive all communications on a particular band or frequency, regardless of the source and/or for particular sources. In another example, a peer sensor tag may be configured to receive status messages and/or particular status messages (e.g., an orphan status message) regardless of the source and/or for particular sources.

In step 708, the second peer sensor tag obtains the at least a portion of the first sensor data from the first beacon signal if the signal is validated/authorized. In some embodiments, the peer sensor tag communication engine of the second peer sensor tag obtains the at least a portion of the first sensor data from the first beacon signal.

In step 710, the second peer sensor tag executes one or more tag rules (e.g., tag rules 222). In some embodiments, a peer sensor tag processing engine (e.g., peer sensor tag processing engine 206) executes the one or more tag rules.

In step 712, the second peer sensor tag generates additional sensor data based on the first sensor data, the second sensor data, and/or the one or more rules. For example, the first sensor data may comprise temperature data, the second sensor data may comprise humidity, and the additional sensor data may comprise dewpoint data. The additional sensor data may also include notifications, alerts, and/or other indicator data. For example, the second peer sensor tag may compare some or all of the sensor data with one or more threshold conditions and/or triggers conditions. In one example, the indicator data may indicate protentional mold growth or other hazard.

In step 714, the second peer sensor tag generates a sensor data summary. The sensor data summary may include representative portions of the first sensor data, second sensor data, and/or additional sensor data. The sensor data summary may be generated by the peer sensor tag processing engine based on the one or more rules. The sensor data summary may allow less data to be transmitted. For example, the sensor data summary may not include duplicate entries, may include compressed data, may include a predetermined amount of data for particular time periods, and/or the like.

In step 716, the second peer sensor tag provides some or all of the first sensor data, second sensor data, additional sensor data, and/or sensor data summary to a base station (e.g., base station 104). For example, the second peer sensor tag may provide the information at predetermined intervals and/or when the second peer sensor tag is within communication range of the base station. The peer sensor tag communication engine may provide the information in a second beacon signal.

In some embodiments, the second peer sensor tag communicates all data within its memory to a base station when the second peer sensor tag is within communication range of that base station. The second peer sensor tag may also clear the memory once the transmission has been completed (e.g., when the peer sensor tag received a confirmation from the base station that the communication has been completed).

Figure 8:
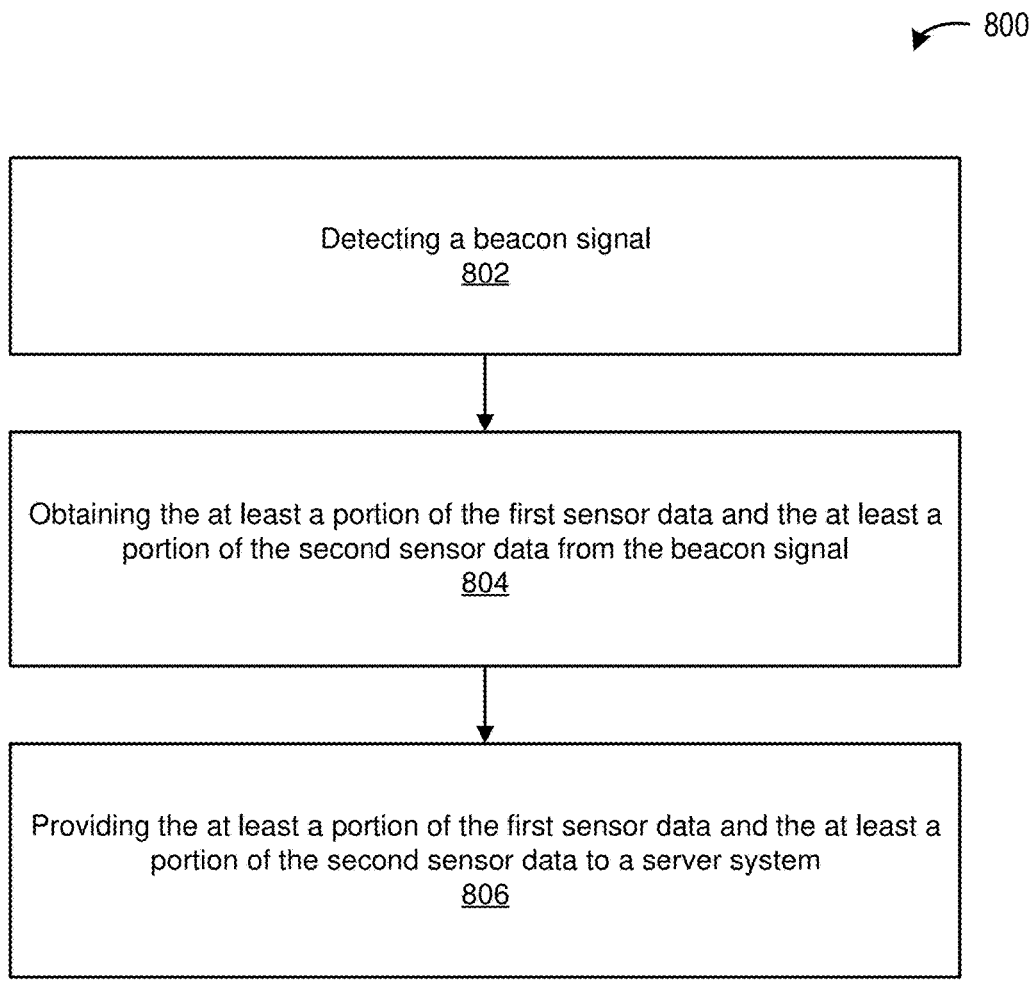
FIG. 8 depicts a flowchart of an example of a method of operation of a base station according to some embodiments.

FIG. 8 depicts a flowchart 800 of an example of a method of operation of a base station according to some embodiments.

In step 802, a base station (e.g., base station 104-1) detects a beacon signal of the second peer sensor tag. The beacon signal may include the at least a portion of the first sensor data and at least a portion of the second sensor data. The beacon signal may be transmitted according to the first network communication protocol. In some embodiments, the beacon signal of the second peer sensor tag may be generated by the peer sensor tag communication engine of the second peer sensor tag. In some embodiments, a base station communication engine (e.g., base station communication engine 302) detects the beacon signal.

In step 804, the base station obtains the at least a portion of the first sensor data and the at least a portion of the second sensor data from the beacon signal. In some embodiments, the base station communication engine obtain the data from the signal.

In step 806, the base station provides the at least a portion of the first sensor data and the at least a portion of the second sensor data to a server system (e.g., routing server system 102), the at least a portion of the first sensor data and the at least a portion of the second sensor data being provided using a second network communication protocol (e.g., a Wi-Fi and/or Internet-based protocol) different from the first network communication protocol. In some embodiments, the base station communication engine provides the data over a communication network (e.g., communication network 112).

Figure 9:
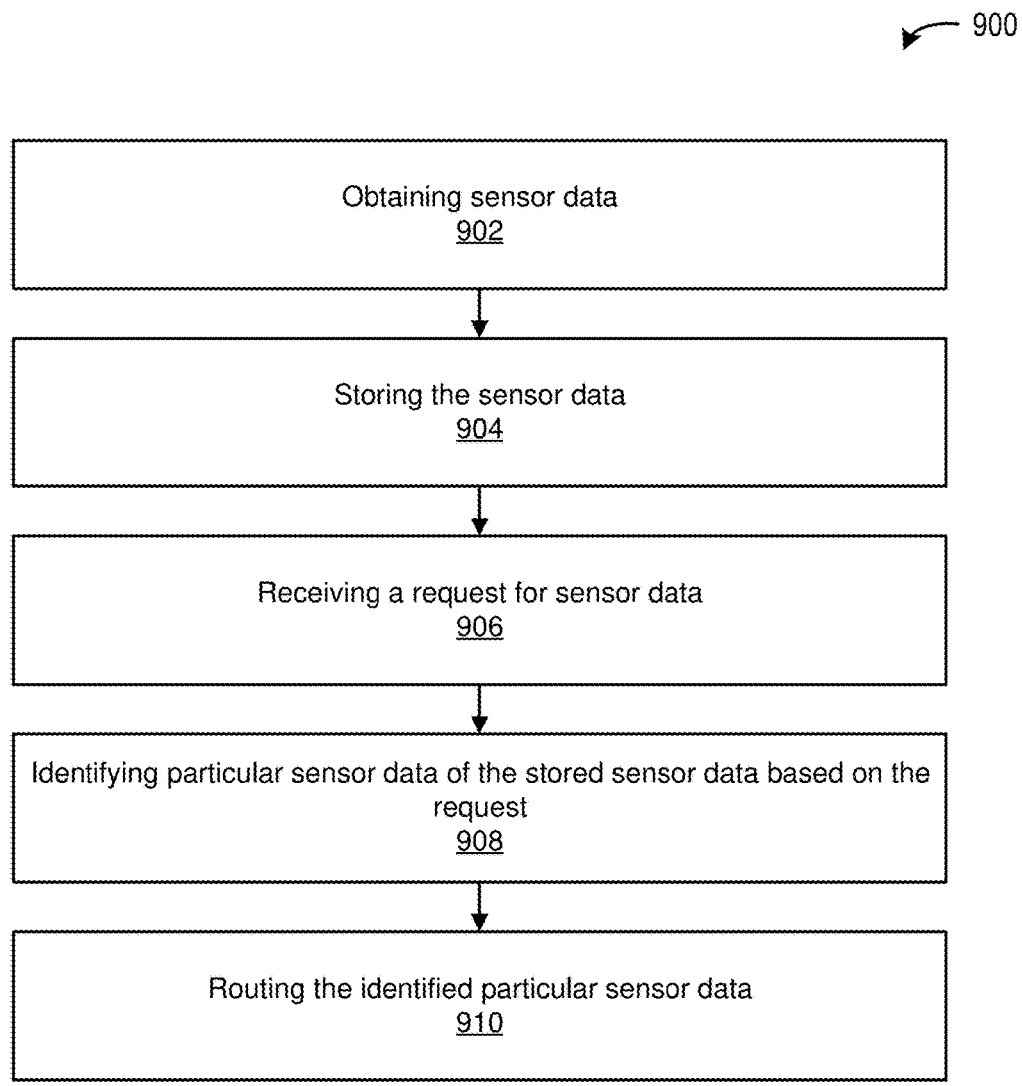
FIG. 9 depicts a flowchart of an example of a method of operation of a routing server according to some embodiments.

FIG. 9 depicts a flowchart 900 of an example of a method of operation of a routing server according to some embodiments. In step 902, a routing server system (e.g., routing server system 106) obtains sensor data (e.g., sensor data 120). The sensor data may be obtained from a based station (e.g., base station 104) over a communications network (e.g., communications network 112). In step 904, the routing server system stores the sensor data. The sensor data may be siloed in one or more datastores of the routing server system. In step 906, the routing server system receives a request for sensor data (e.g., from a third-party client system 110). For example, a particular entity (e.g., Walmart) may want to obtain locations of particular assets, obtain sensor data of their peer sensor tags, and/or the like. In step 908, the routing server system identifies particular sensor data based on the request. For example, the request may include an entity identifier (e.g., Walmart identifier), and one or more search attributes (e.g., desired types of sensor data). In step 910, the routing server system routes the identified sensor data (e.g., to a third-party client system 110). The routing server system may route the identified sensor data over the communications network.

Figure 10:
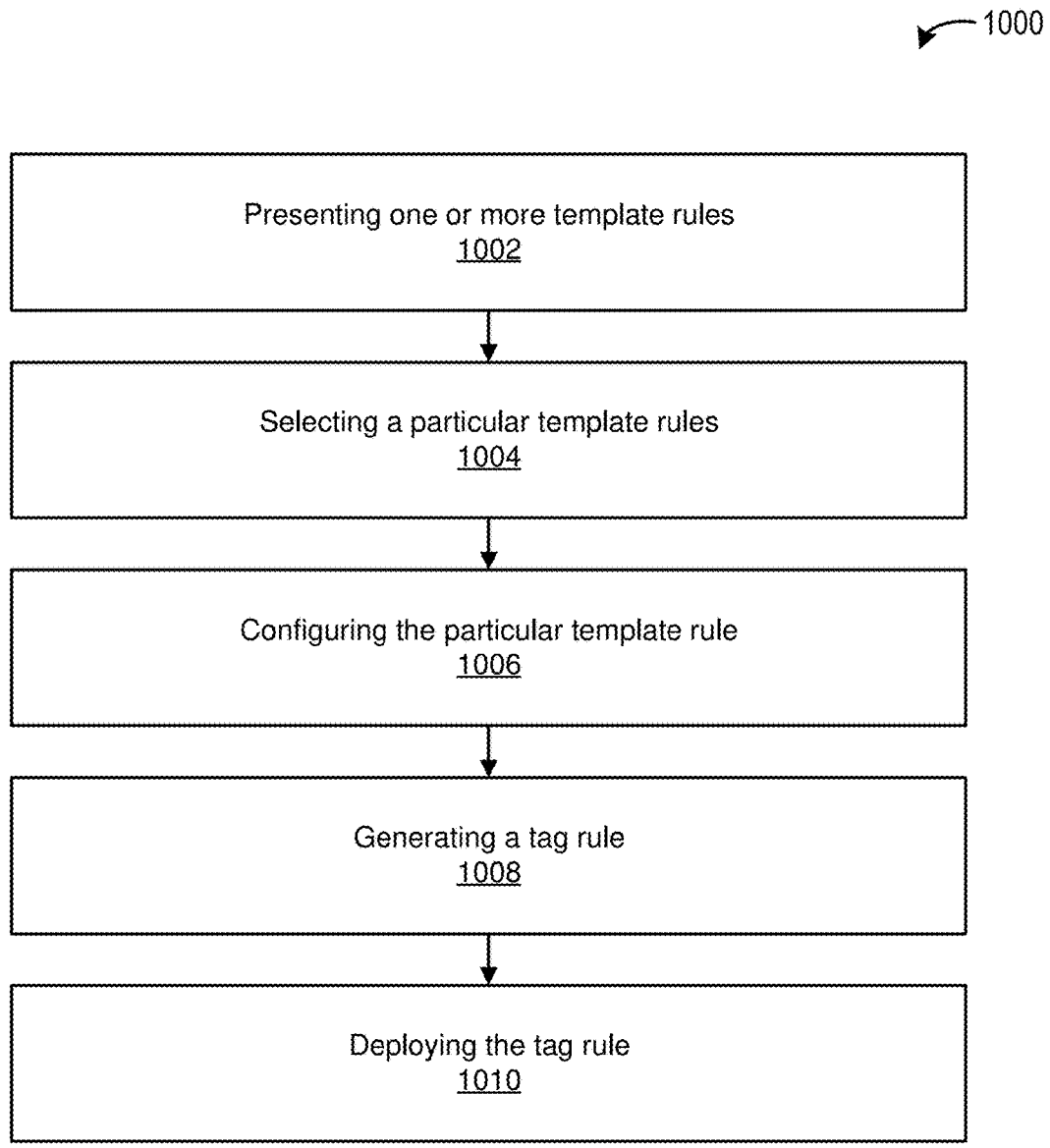
FIG. 10 depicts a flowchart of an example of a method of operation of a tag configurator system according to some embodiments.

FIG. 10 depicts a flowchart 1000 of an example of a method of operation of a tag configurator system according to some embodiments.

In step 1002, a tag configurator system (e.g., tag configurator system 108) presents one or more template rules (e.g., template rules 410). In some embodiments, a presentation engine (e.g., presentation engine 402) presents the template rules.

In step 1004, the tag configurator system selects a particular template rule from the one or more template rules. In some embodiments, the presentation engine selects the particular template rule in response to user input.

In step 1006, the tag configurator system configures the particular template rule. In some embodiments, a rules creation engine configures the particular template rule (e.g., based on user input). For example, a user may specify trigger conditions (e.g., for generating alerts or notifications), blacklists, whitelists, entity operators, and the rules creation engine may configure the particular template rule accordingly.

In step 1008, the tag configurator system generates a peer sensor tag rule (e.g., tag rule 122) from the configured particular template rule. In some embodiments, the rules creation engine generates the peer sensor tag rule.

Figure 11:
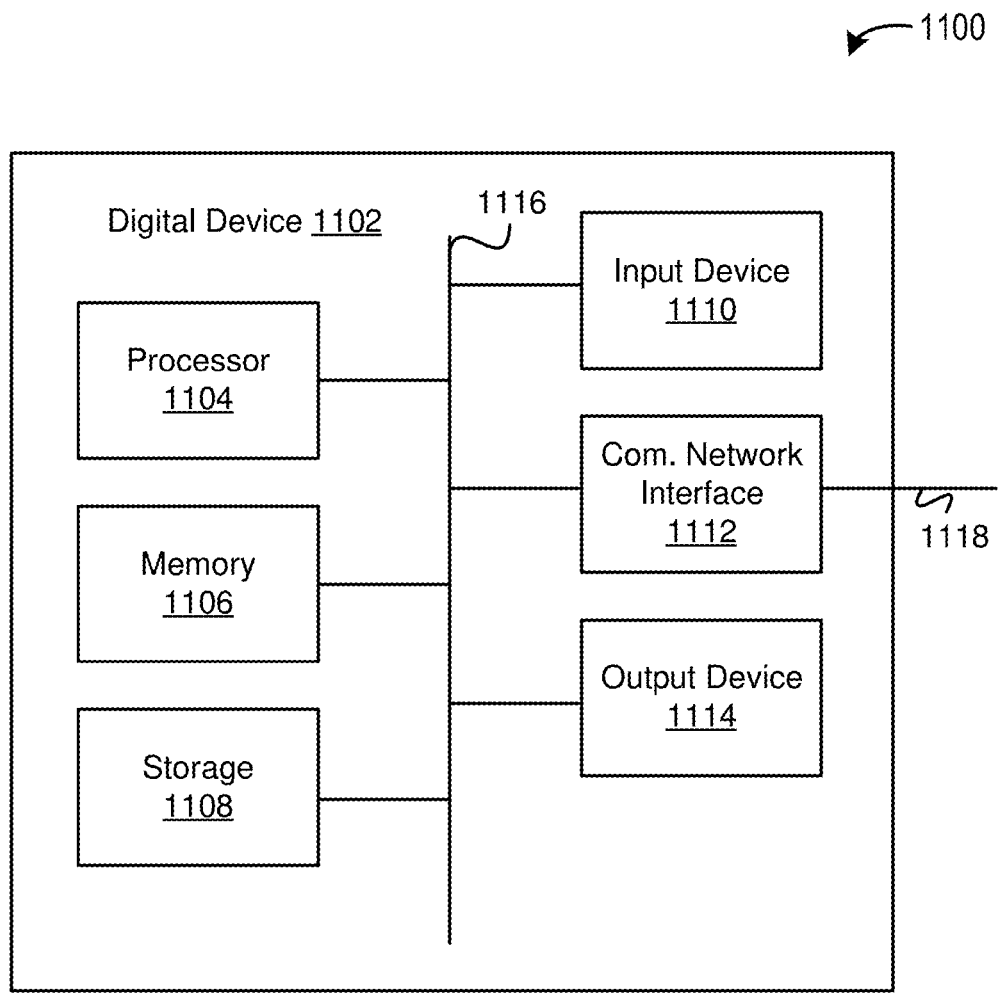
FIG. 11 depicts a diagram of an example of a computing device according to some embodiments.

In step 1010, the tag configurator system deploys the peer sensor tag rule to one or more peer sensor tags (e.g., peer sensor tags 102). In some embodiments, a communication engine (e.g., communication engine 406) deploys the peer sensor tag rule. FIG. 11 depicts a diagram 1100 of an example of a computing device 1102. Any of the systems 102-108, and the communication network 110 may comprise an instance of one or more computing devices 1102. The computing device 1102 comprises a processor 1104, memory 1102, storage 1108, an input device 1110, a communication network interface 1112, and an output device 1114 communicatively coupled to a communication channel 1116. The processor 1104 is configured to execute executable instructions (e.g., programs). In some embodiments, the processor 1104 comprises circuitry or any processor capable of processing the executable instructions.

The memory 1102 stores data. Some examples of memory 1102 include storage devices, such as RAM, ROM, RAM cache, virtual memory, etc. In various embodiments, working data is stored within the memory 1102. The data within the memory 1102 may be cleared or ultimately transferred to the storage 1108.

The storage 1108 includes any storage configured to retrieve and store data. Some examples of the storage 1108 include flash drives, hard drives, optical drives, cloud storage, and/or magnetic tape. Each of the memory system 1102 and the storage system 1108 comprises a computer-readable medium, which stores instructions or programs executable by processor 1104.

The input device 1110 is any device that inputs data (e.g., mouse and keyboard). The output device 1114 outputs data (e.g., a speaker or display). It will be appreciated that the storage 1108, input device 1110, and output device 1114 may be optional. For example, the routers/switchers may comprise the processor 1104 and memory 1102 as well as a device to receive and output data (e.g., the communication network interface 1112 and/or the output device 1114).

The communication network interface 1112 may be coupled to a network (e.g., network 110) via the link 1118.

The communication network interface 1112 may support communication over an Ethernet connection, a serial connection, a parallel connection, and/or an ATA connection. The communication network interface 1112 may also support wireless communication (e.g., 802.11 a/b/g/n, WiMax, LTE, WiFi). It will be apparent that the communication network interface 1112 may support many wired and wireless standards.

It will be appreciated that the hardware elements of the computing device 1102 are not limited to those depicted in FIG. 11. A computing device 1102 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1104 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system comprising:
a first peer sensor tag configured to sense first sensor data using a first local sensor of the first peer sensor tag;
a second peer sensor tag configured to:
sense second sensor data using a second local sensor of the second peer sensor tag while the second peer sensor tag is not within a communication range of the first peer sensor tag;
detect a first beacon signal of the first peer sensor tag, the first beacon signal including at least a portion of the first sensor data, the first beacon signal being transmitted according to a first network communication protocol; and
obtain the at least a portion of the first sensor data from the first beacon signal; and
a base station configured to:
detect a second beacon signal of the second peer sensor tag, the second beacon signal including the at least a portion of the first sensor data and at least a portion of the second sensor data;
obtain the at least a portion of the first sensor data and the at least a portion of the second sensor data from the second beacon signal; and
provide the at least a portion of the first sensor data and the at least a portion of the second sensor data to a server system, the at least a portion of the first sensor data and the at least a portion of the second sensor data being provided using a second network communication protocol different from the first network communication protocol.

2. The system of claim 1, wherein the first sensor data comprises temperature data, and the first local sensor of the first peer sensor tag comprises a temperature sensor.

3. The system of claim 1, wherein the second sensor data comprises humidity data, and the second local sensor of the second peer sensor tag comprises a humidity sensor.

4. The system of claim 1, wherein the first network communication protocol comprises a low-power network communication protocol.

5. The system of claim 1, wherein the second network communication protocol comprises an Internet-based network communication protocol.

6. The system of claim 1, wherein the second peer sensor tag is further configured to validate a source of the first beacon signal prior to obtaining the at least a portion of the first sensor data from the first beacon signal.

7. The system of claim 1, wherein the second peer sensor tag is further configured to generate additional sensor data based on the at least a portion of the first sensor data, the at least a portion of the second sensor data, and one or more tag rules executing on the second peer sensor tag.

8. The system of claim 7, wherein the additional sensor data is generated in response to a trigger condition of the one or more tag rules, and the additional sensor data is capable of facilitating generation of a corresponding alert or notification.

9. The system of claim 7, wherein at least one of the one or more tag rules is at least partially user-defined by a user associated with an entity operating the second peer sensor tag.

10. A method comprising:
sensing, by a first peer sensor tag, first sensor data, the first sensor data being sensed by a first local sensor of the first peer sensor tag;
sensing, by a second peer sensor tag, second sensor data, the second sensor data being sensed by a second local sensor of the second peer sensor tag while the second peer sensor tag is not within a communication range of the first peer sensor tag;
detecting, by the second peer sensor tag, a first beacon signal of the first peer sensor tag, the first beacon signal including at least a portion of the first sensor data, the first beacon signal being transmitted according to a first network communication protocol;
obtaining, by the second peer sensor tag, the at least a portion of the first sensor data from the first beacon signal;
detecting, by a base station, a second beacon signal of the second peer sensor tag, the second beacon signal including the at least a portion of the first sensor data and at least a portion of the second sensor data, the second beacon signal being transmitted according to the first network communication protocol;
obtaining, by the base station, the at least a portion of the first sensor data and the at least a portion of the second sensor data from the second beacon signal; and
providing, by the base station, the at least a portion of the first sensor data and the at least a portion of the second sensor data to a server system, the at least a portion of the first sensor data and the at least a portion of the second sensor data being provided using a second network communication protocol different from the first network communication protocol.

11. The method of claim 10, wherein the first sensor data comprises temperature data, and the first local sensor of the first peer sensor tag comprises a temperature sensor.

12. The method of claim 10, wherein the second sensor data comprises humidity data, and the second local sensor of the second peer sensor tag comprises a humidity sensor.

13. The method of claim 10, wherein the first network communication protocol comprises a low-power network communication protocol.

14. The method of claim 10, wherein the second network communication protocol comprises an Internet-based network communication protocol.

15. The method of claim 10, further comprising validating, by the second peer sensor tag, a source of the first beacon signal prior to obtaining the at least a portion of the first sensor data from the first beacon signal.

16. The method of claim 10, further comprising generating, by the second peer sensor tag, additional sensor data based on the at least a portion of the first sensor data, the at least a portion of the second sensor data, and one or more tag rules executing on the second peer sensor tag.

17. The method of claim 16, wherein the additional sensor data is generated in response to a trigger condition of the one or more tag rules, and the additional sensor data is capable of facilitating generation of a corresponding alert or notification.

18. The method of claim 16, wherein at least one of the one or more tag rules is at least partially user-defined by a user associated with an entity operating the second peer sensor tag.

* * * * *